United States Patent [19]

Steelman

[11] Patent Number: 5,370,285
[45] Date of Patent: Dec. 6, 1994

[54] QUICK RELEASE SPARE TIRE RACK

[76] Inventor: Michael E. Steelman, P.O. Box 791, Cheriton, Va. 23316

[21] Appl. No.: 167,174

[22] Filed: Dec. 16, 1993

[51] Int. Cl.$^5$ .............................................. B62D 43/00
[52] U.S. Cl. .............................. 224/42.021; 224/42.06; 224/42.012
[58] Field of Search .................. 224/42.21, 42.03 R, 224/42.03 B, 42.6, 42.12, 42.25, 43.45

[56] References Cited

U.S. PATENT DOCUMENTS

| 4,140,255 | 2/1979 | Weiler | 224/42.21 X |
| 4,485,945 | 12/1984 | Ankeny | 224/42.06 |
| 4,561,575 | 12/1985 | Jones | 224/42.21 |
| 4,717,054 | 1/1988 | Vanzant | 224/42.21 |
| 4,971,237 | 11/1990 | Davis | 224/42.06 |
| 4,991,810 | 2/1991 | Andrus et al. | 224/42.45 R |
| 5,104,015 | 4/1992 | Johnson | 224/42.06 |
| 5,108,018 | 4/1992 | Spinka | 224/42.03 R |
| 5,190,195 | 3/1993 | Fullhart et al. | 224/42.03 B |
| 5,271,387 | 12/1993 | Murray | 224/271 X |

Primary Examiner—Henry J. Recla
Assistant Examiner—David J. Walczak
Attorney, Agent, or Firm—Rhodes & Ascolillo

[57] ABSTRACT

A swing-away rack for mounting a spare tire to a substantially vertical surface of a motor vehicle. A spare tire holder is mounted on a vertical support member which is pivotally mounted on a hinge. The hinge enables the support member and the spare tire to be swung sufficiently downwardly and backwardly to avoid the swinging arc of an adjacent door mounted on the motor vehicle, thus enabling access to the door. A latch maintains the support member in its normal, vertical orientation. The latch comprises a thin resilient bar which is disposed adjacent and parallel to the support member. The latch has an opening which cooperates with a projecting member secured to the vertical support member. When this projecting member penetrates the opening, the support member is constrained against lowering. When the latch is resiliently drawn away from the support member, the projecting member is released from the opening, and the support member may be lowered. A locking member, releasably mounted to a distal end of the projecting member, prevents unintended disengagement of the projecting member from the latch. A handle attached to the latch enables convenient manipulation of the latch during release of the projecting member.

11 Claims, 3 Drawing Sheets

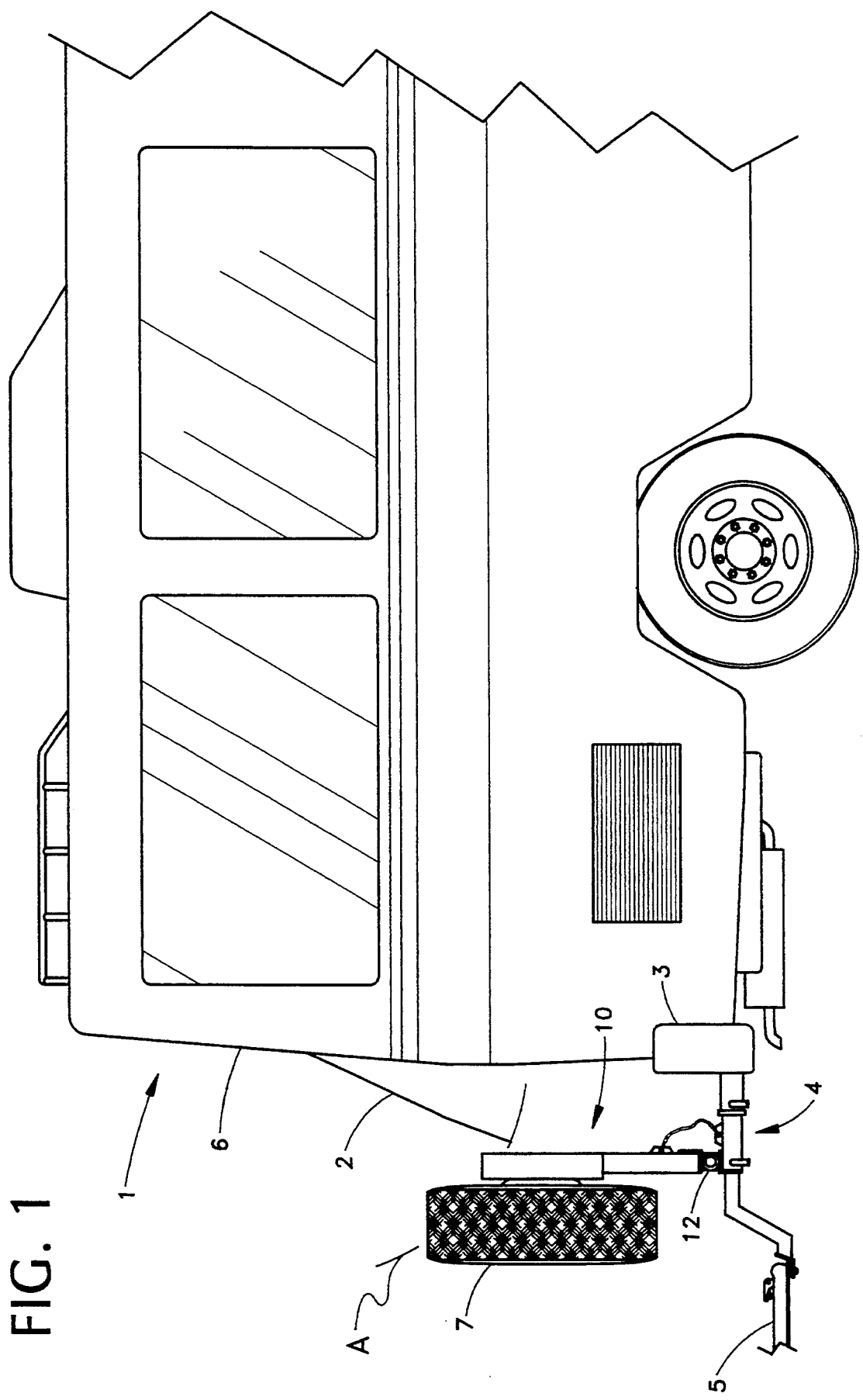

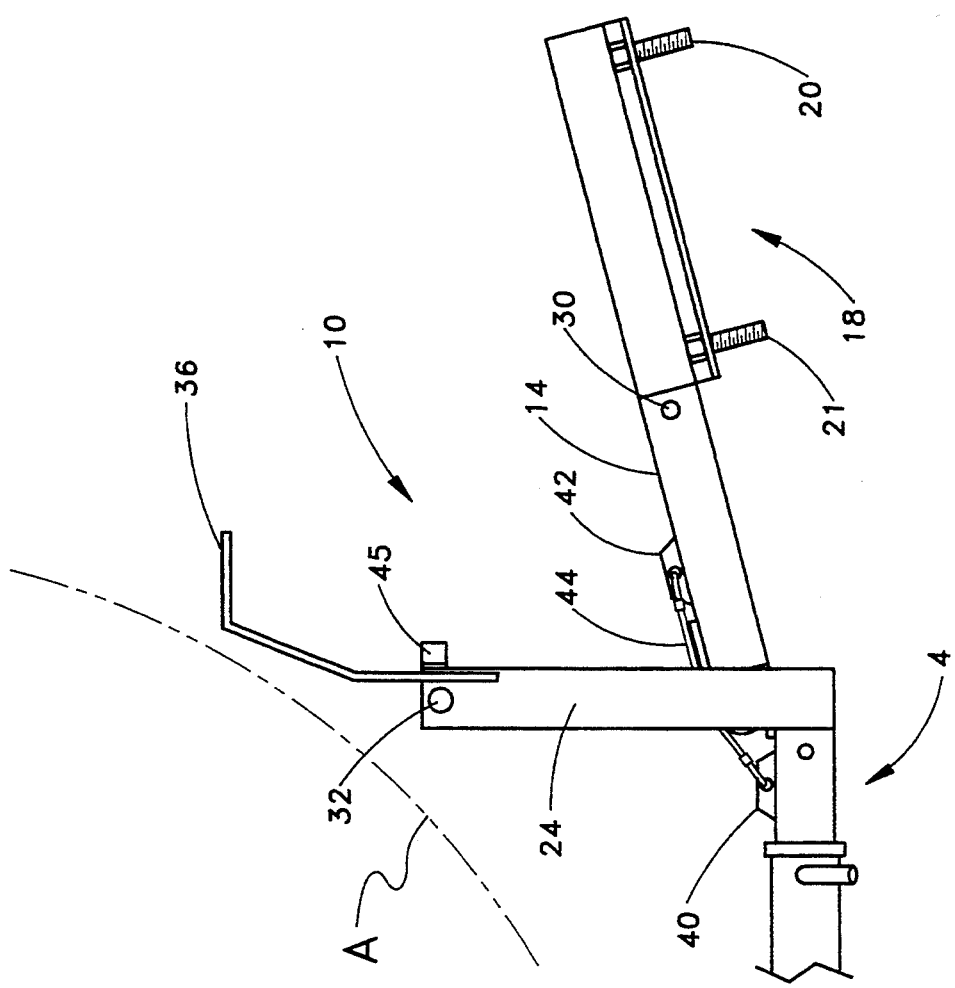
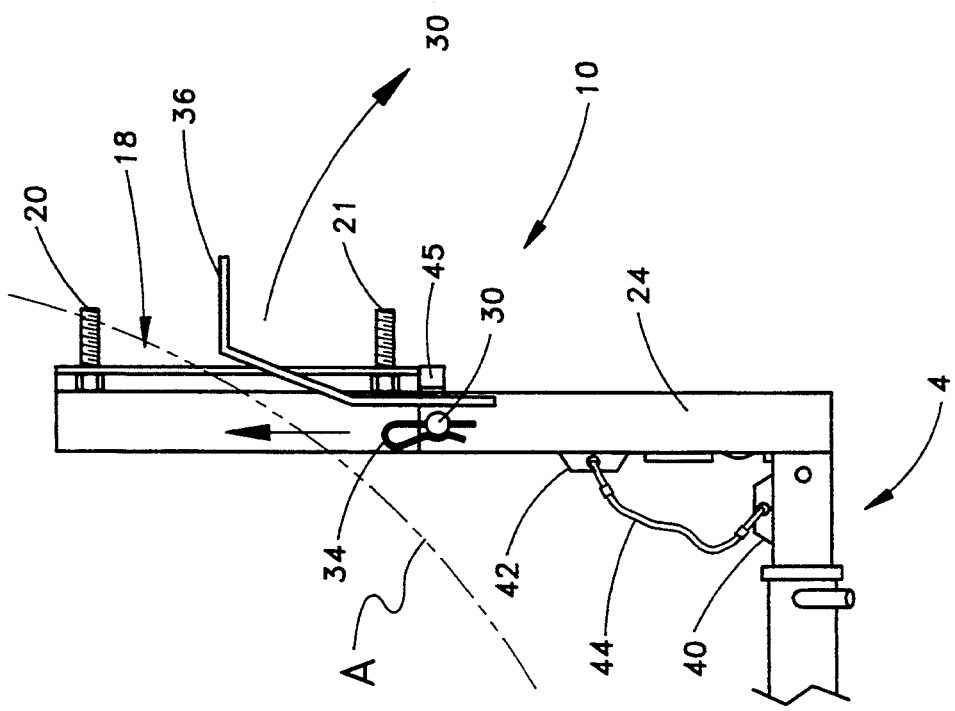

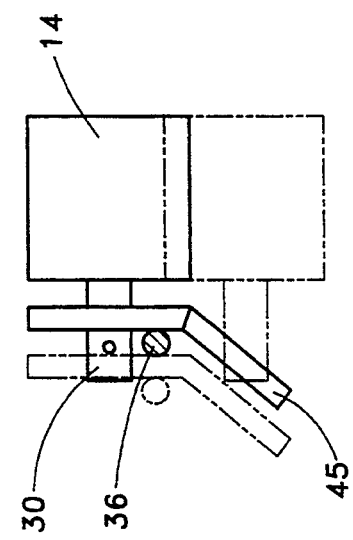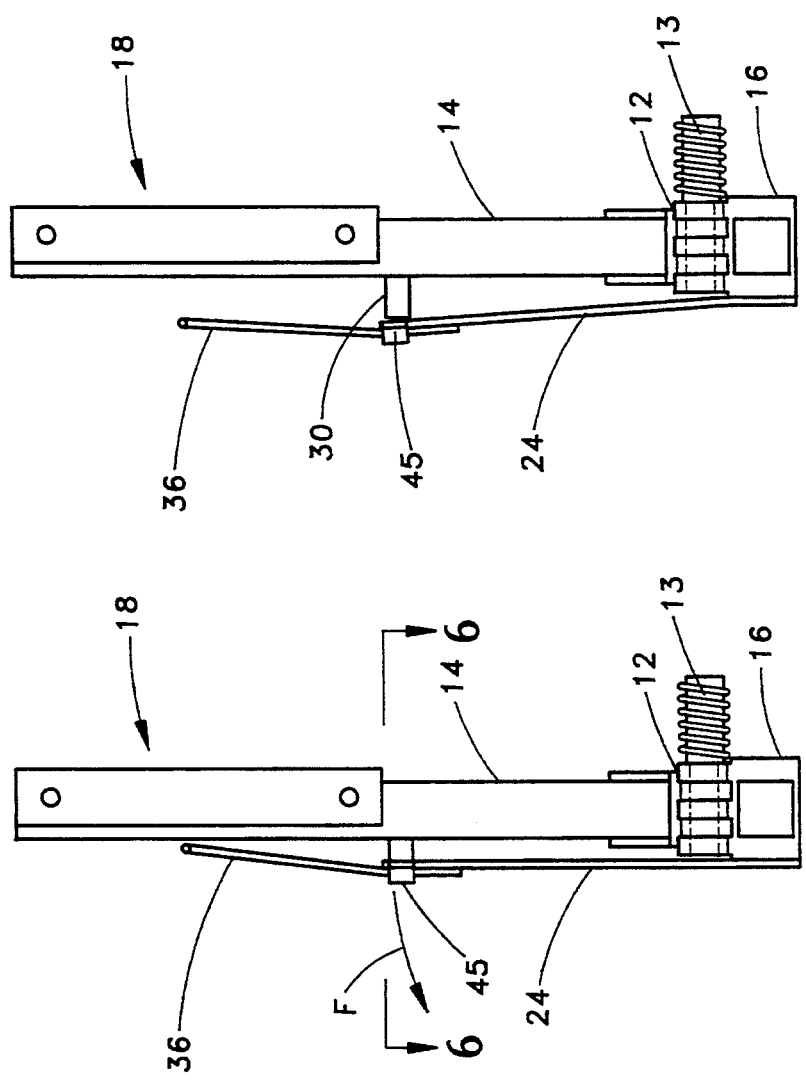

QUICK RELEASE SPARE TIRE RACK

BACKGROUND OF THE INVENTION

1. Field of the Invention

The present invention relates to a rack for movably mounting a spare piece of machinery equipment so it may be easily moved for gaining access to and servicing another portion of that equipment. More specifically, the present invention relates to a rack for pivotally mounting a spare tire to a motor vehicle. The pivoted rack allows access to the engine compartment of the vehicle without completely removing the spare tire from its berth, which is normally adjacent the engine access cover on motor homes and recreational vehicles. In general, however, the pivoted rack of this invention could find use on any machine where space restrictions force the obstructing of a portion of the machine by another portion of the machine although access to both portions is required from time to time.

Thus it can be seen that the potential fields of use for this invention are myriad and the particular preferred embodiment described herein is in no way meant to limit the use of the invention to the particular field chosen for exposition of the details of the invention. A comprehensive listing of all the possible fields to which this invention may be applied is limited only by the imagination and is therefore not attempted here. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Motor vehicles are normally provided with a spare pneumatic tire mounted on a wheel. Throughout this specification reference to the phrase "spare tire" should be taken to mean the overall combination of a tire mounted upon a wheel in accordance with common vernacular. In small sedans, the spare tire is typically stored in the trunk of the vehicle. In many large vehicles, and in particular, motor homes and recreational vehicles, the spare tire is mounted at the back of the vehicle. This location typically interferes with the swing of the door which provides access to the rear engine compartment of the motor home. It is therefore desirable to provide a spare tire holder which holds the spare tire, which lowers the spare tire to a point of ready access whenever a tire must be replaced, and which moves out of interference when the engine must be serviced.

In U.S. Pat. No. 5,104,015 issued on Apr. 14, 1992 to Bruce D. Johnson there is disclosed a storage apparatus for use on the rear wall of a sport vehicle. A spare tire rack swings the tire first down about one pivot axis, and then to the side about another pivot axis, to allow access to the vehicle through a tailgate and a rear window. The latching mechanism is complex and provides absolutely no additional strength or rigidity to the spare tire supporting mechanism. In contrast, the instant invention requires only a single simple pivot axis and the simple latching mechanism also serves to provide additional strength and rigidity to the tire support.

U.S. Pat. No. 4,971,237 issued on Nov. 20, 1990 to Darrel B. Davis provides a carrier rack to lower an externally mounted spare tire to a position proximate the ground for ease of removal from the rack. The spare tire and rack is stopped from pivoting only when a portion of the rack comes into contact with the ground. The latching mechanism consists of at least two removable pins and provides no additional support to the spare tire in a stowed position. Contrast this with the instant invention where a cable stop limits the amount of pivoting of the spare tire without depending upon contact with the ground; also, the resilient latching bar provides additional strength and rigidity to the tire support.

In U.S. Pat. No. 4,717,054 issued on Jan. 5, 1988 to Teddy L. Vanzant there is disclosed a tire carrier adapted with a bumper mounted hinge and a gas cylinder to counterbalance the tire during the lowering motion. The latching mechanism requires the alignment of a pin with two bores and provides no support for the weight of the spare tire in the vertical position. Contrast this with the instant invention where the latch bar also provides support for the spare tire weight, thus allowing a much lighter duty pivot mechanism to be used.

In U.S. Pat. No. 4,561,575 issued on Dec. 31, 1985 to Robert R. Jones there is disclosed a swing-away tire carrier and hitch. The dual pivots are latched in the stowed position by pins which provide no support for the weight of the spare tire. The tire pivots downwardly until, it contacts the ground. By contrast, the instant invention provides a cable stop which prevents the tire or its carrying arm from ever contacting the ground, and the simple resilient latching bar also provides support for the stowed tire.

Lastly, U.S. Pat. No. 4,485,945 issued on Dec. 4, 1984 to Robert R. Jones discloses a spare tire carrier for attachment to the tailgate of a pickup truck which swings downwardly with the tailgate. Since the carrier does not pivot with respect to the tailgate, latching means are not provided.

None of the above inventions and patents provides both a means for latching the spare tire in the stowed position and a substantial structural support for the weight of the spare tire during transport. As a result, the pivot mechanisms of all the prior patents must be strong enough to withstand, by themselves, the dynamic forces generated by the vehicle vibrations during driving over rough terrain. The present invention, by combining the latching means with a structural support member, both reduces the number of parts required and allows the use of a less expensive lighter duty pivot mechanism. The prior patents in this field did not contemplate such a use for a latching member and are incapable of performing in such a context.

The prior patents that contemplated the provision of a stop for the pivoting motion of the spare tire carrier utilize contact with the ground as the stop means. The ground however may not be level and firm at the place the spare tire needs to be pivoted downwardly. One usually has no choice where to stop a vehicle to change a flat tire or service an engine. In contradistinction, the instant invention provides a positive yet simple cable stop means which is independent of the condition of the supporting ground surface.

None of the above inventions and patents representing the prior art, taken either singly or in combination, anticipates or makes obvious the invention claimed herein.

Accordingly, it is a principal object of the invention to provide a spare tire holder which holds a spare tire against a vertical outside surface of a motor vehicle thus creating more usable space in the interior of the vehicle.

It is another object of the invention to provide a spare tire holder which enables the spare tire to be swung downwardly without requiring the user to manually support the entire weight of the tire.

It is another object of the invention to provide a spare tire holder which will stop lowering at a predetermined position and be maintained in that position without further effort from the user and without contact with the ground.

It is yet another object of the invention to provide a spare tire holder which enables the spare tire to be swung away from the motor vehicle, thereby avoiding interference with the door swing path of an engine access door disposed on the motor vehicle, while not requiring the spare tire to be removed from the spare tire holder.

It is a further object of the invention to provide a latch for immobilizing the spare tire holder in the normal, stowed position.

Still another object of the invention is to provide a latch for a spare tire holder which is permanently attached thereto, and is readily and manually disengageable from the spare tire holder.

Still another object of the invention is to provide a latch bar which is rigidly attached to the vehicle frame at one end so as to provide additional support for the spare tire in the stowed position and which is resilient so as to easily release the tire with a simple pulling motion when desired.

An additional object of the invention is to provide a safety clip for preventing unintended release of the spare tire holder by the resilient latch bar.

It is a general goal of the invention to provide improved elements and arrangements thereof in an apparatus for the purposes described which is inexpensive, dependable and fully effective in accomplishing its intended purposes.

It is submitted that the present invention meets or exceeds all the above objects and goals. Upon further study of the specification and appended claims, further objects and advantages of this invention will become apparent to those skilled in the art.

SUMMARY OF THE INVENTION

The preferred embodiment of this invention provides a rack for mounting an auxiliary item to a machine, the rack maintaining the auxiliary item adjacent to an outside vertical surface of the machine. The rack comprises an item holder, a support member and a latching means. The item holder has means for engaging the auxiliary item. The support member connects the item holder to the machine, and the support member includes a hinge having a pivot axis substantially horizontal and parallel to the outside vertical surface of the machine. The support member is swingable about the axis between a stowed position, wherein the auxiliary item is adjacent to the outside vertical surface of the machine, and a lowered position, wherein the auxiliary item is pivoted downwardly away from the machine. The latching means secures the auxiliary item erect and adjacent to the outside vertical surface of the machine and bears a substantial portion of the weight of the auxiliary item.

The latching means comprises a latch pin projecting from the support member and a latching bar having means defining an opening therein, a width dimension and a much smaller thickness dimension, and having an opening defined in a distal end of the latching bar, the opening facing and cooperatingly receiving the latch pin, and being made from resilient material which enables the latching bar to be resiliently bent away from the support member to an extent enabling the opening to be disengaged from the latch pin, whereby the item holder may be swung down from the stowed position to the lowered position.

A second preferred embodiment of this invention provides a rack for mounting a spare tire to a motor vehicle, the rack maintaining the spare tire adjacent to a vertical surface of the motor vehicle. The rack comprises a wheel holder, a support member, and a latching means. The wheel holder has means for engaging a spare tire. The support member connects the wheel holder to the motor vehicle, the support member including a hinge having a pivot axis substantially horizontal and parallel to the rear surface of the motor vehicle, the support member being swingable about the axis between a stowed position wherein the spare tire is adjacent to the vertical surface of the motor vehicle, and a lowered position wherein the spare tire is pivoted toward the rear of the motor vehicle, and downwardly. A spring member is connected to the hinge and biases the support member toward the stowed position. The latching means secures the wheel holder erect and adjacent to the vertical surface of the motor vehicle.

In this second embodiment, the latching means comprises a latch pin projecting from the support member and a latching bar having a rectangular cross-section that includes a width dimension and a much smaller thickness dimension, and having an opening defined in a distal end of the latching bar, the opening facing and cooperatingly receiving the latch pin, and the latching bar being made from resilient material which enables the latching bar to be resiliently bent away from the support member to an extent enabling the opening to be disengaged from the latch pin, whereby the wheel holder may be swung down from the stowed position to the lowered position.

In the second preferred embodiment, the latch pin further includes retaining means for maintaining the latch pin engaged with the latching bar, the retaining means comprises a clip or a locking member attachable to the latch pin, and the latching bar further includes an operating handle.

The rack of the second preferred embodiment further comprises a stop means for limiting the lowered position, the stop means being suspended above a supporting surface upon which the motor vehicle rests. The stop means comprises a fixed anchor means, a movable anchor means, and a fixed length flexible member connecting the fixed anchor means and the movable anchor means. The fixed length flexible member is a steel cable.

The rack of the second preferred embodiment further comprises an engaging ramp member which is attached to a rearward edge of a distal end of the latching bar, such that the engaging ramp member is capable of releasably and slidingly engaging the latch pin, the engaging ramp member being made from resilient material which enables the latching bar to be resiliently bent away from the support member when the ramp member slidingly engages the latch pin, the latching bar capable of being resiliently bent away by the engaging ramp member to an extent which subsequently enables the opening to be engaged by the latch pin, whereby the wheel holder may be swung up from the lowered position to the stowed position with one upward motion.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a partial right side view of a recreational vehicle showing the inventive spare tire carrier mounted at the rear thereof.

FIG. 2 is a detailed left side view of the inventive tire carrier, with the tire removed, in the upright latched and locked position.

FIG. 3 is a detailed left side view of the inventive tire carrier, with the tire removed, in the lowered position to provide clearance for the vehicle engine access door.

FIG. 4 is a rear view of the inventive tire carrier, with the tire removed, in the upright latched position.

FIG. 5 is a rear view of the inventive tire carrier, with the tire removed, in the upright unlatched position.

FIG. 6 is a top plan view showing the engaging ramp member moving outward and the swinging support member moving from a secured position to an open position.

DETAILED DESCRIPTION OF THE PREFERRED EMBODIMENT

The present invention will now be described with reference to the accompanying drawings. Referring first to FIG. 1, there is shown a typical motor home or recreational vehicle 1 with a rear engine access door 2 mounted in generally vertical rear surface 6 of the vehicle body. It will be noted that the clearance arc "A" (also see FIG. 2) of access door 2 encounters interference with the rear mounted spare tire rack 10 in this position. It should be noted that the rear mounted tire rack and rear engine access door are representative only and not meant to be the only possible embodiment. For example, the spare tire rack might as well be mounted on the side of a bus and the access door might as well be the passenger luggage access door. The routinist will be able to envisage many other situations where access is a problem and where this invention might find useful application. Spare tire 7, carried by tire rack 10, is seen in FIG. 1 to be pivotally mounted by hinge 12 on telescopic hitch mechanism 4 extending from rear bumper 3 of vehicle 1. It is obvious that the support for hinge 12 could as well be a platform (not shown) welded or otherwise rigidly affixed to the vehicle frame in the event the vehicle were not equipped with a hitch. The main requirement for the support is that it be rigidly fixed, either directly or indirectly, to the vehicle frame. Partially shown for illustrative purposes is trailer hitch 5 which is connected to a towed vehicle (not shown) in a conventional manner.

Turning now to FIGS. 2 through 6, the details of the inventive spare tire rack 10 will be described. The primary function of the rack 10 is to provide rigid and secure locking of a spare tire unit closely adjacent an exterior wall of a vehicle and, at the same time, provide an easily operable and foolproof mechanism for clearing the arc "A" of an access door or panel (see FIGS. 1 and 2). Swinging support member 14 pivotally connects to base 16 at hinge 12; base 16 is welded or otherwise securely affixed to an element of telescopic hitch 4 as best seen in FIGS. 4 and 5. Hinge 12 is arranged such that its axis is generally parallel to rear vertical surface 6. Hinge 12 is biased by spring 13 to maintain support member 14 in a vertical position to aid in lowering and raising the spare tire unit. Spring 13 may be mounted interiorly (not shown) or exteriorly (as shown in FIGS. 4 and 5) of hinge 12. At the end of swinging support member 14 opposite hinge 12 is a wheel holder 18 having bolts 20 and 21 for supporting a spare tire and wheel. The precise configuration of the wheel holder forms no part of this invention and any of the many forms shown by the prior art would be adequate. Wheel holder 18 is rigidly affixed to swinging support member 14 so as to swing with it during any rotation about hinge 12. Projecting laterally from the side of swinging support member 14 is a latch pin 30. Pin 30 is also rigidly and permanently affixed to swing support member 14 and is located at a point intermediate hinge 12 and wheel holder 18. Latch pin 30 cooperates with hole 32 in resilient latching bar 24 as more fully described later.

The structure thus far described forms a more or less conventional pivoted spare tire holding arm such as may be found in the prior art. The structure now to be described, however, is totally unique and nowhere shown or described prior to my invention.

Laterally spaced from swinging support member 14 and rigidly attached to base member 16 proximate hinge 12 is a long relatively thin rectangular latching bar 24. The cross section of the bar is such that it is relatively resilient about its thin dimension much in the same manner as a leaf spring. In all other directions, however, the bar is rigid and unyielding. This allows the bar to be flexed away from the swinging support member 14 as shown by arrow F in FIG. 4. Hole 32 at the top end of resilient latching bar 24 can thus be pulled clear of projecting latch pin 30 on swinging support member 14 in order to free the swinging support member 14 for unfettered rotation about hinge 12. Resilient bar 24 is shown flexed to the unlatched position in FIG. 5. A key feature of this latching bar arrangement, aside from its simplicity, is that the resilient bar 24, being fixed to the rigid base member 16, provides appreciable physical support for the weight of the spare tire in the transport position. As seen in FIG. 2 a safety clip 34 or some other locking member such as a padlock (not shown) may be inserted through a cross bore near the free end of latch pin 30 to positively prevent accidental flexing of resilient bar 24 from releasing pin 30 and allowing the swinging support member 14 to pivot downwardly when not desired. An operating handle 36 is welded or otherwise rigidly affixed to the top end of resilient bar 24 for the purpose of assisting manual flexing of the bar as previously described. Of course rubberized grip materials and other embellishments which are not shown here are considered well within the scope this invention.

Welded or otherwise affixed to the upper portion of a section of hitch 4 is a fixed cable anchor 40 as best seen in FIGS. 2 and 3. Welded or otherwise affixed to a side of swinging support member 14 is 12 a movable cable anchor 42. Between these two anchors, 40 and 42, is attached a steel cable 44. The two anchors, 40 and 42, are arranged so that the distance between them increases as the swinging support member 14 pivots downwardly about hinge 12. Cable 44 is long enough to allow free pivoting for approximately 80 degrees, at which point it becomes taut and prevents further rotation. This will prevent the accidental catastrophic fall of a heavy spare tire mounted to wheel holder 18. Aside from its simplicity the outstanding feature of this stop means is that it in no way depends upon contact with the ground for its operation. it is contemplated that other flexible members such as nylon strap and the like might as well be used in place of the steel cable.

Welded or otherwise affixed to a rearward edge of a distal end of the latching bar 24 is an engaging ramp member 45 as seen in FIGS. 3, 5 and 6. The engaging ramp member 45 is preferably mounted flush against the surface of latching bar 24 which faces support member 14 and is angled away from such such surface at an acute angle, for example 45 degrees.

In use, spare tire 7 is carried by tire rack 10 which is pivotally mounted by hinge 12 on telescopic hitch mechanism 4 extending from rear bumper 3 of vehicle 1. In order to open rear engine access door 2, spare tire 7 and tire rack 10 must be swung downward to allow the access door 2 to swing freely along clearance arc "A". The user removes safety clip or locking member 34, then pulls handle 36 outward, thereby flexing latching bar 24 away from the swinging support member 14 and disengaging hole 32 from the projecting latch pin 30. Swinging support member 14 is then relatively free to swing downwardly; some resistance to the downward movement is provided by spring 13. Steel cable 44 limits the swinging motion to approximately 80 degrees. Latching bar 24 flexes back to its original, unflexed, substantially vertical position after release by the user. After access to door 2 is complete, swinging support member 14 is pushed upward toward the vehicle 1, assisted by the bias of spring 13. Sufficient momentum should be generated to swing the spare tire 7 and tire rack 10 upward such that latch pin 30 makes contact with engaging ramp member 45, and slidingly engages ramp member 45 while flexing latching bar 24 outward, until latch pin 30 engages hole 32, whereupon latching bar 24 flexes inward after spare tire 7 and tire rack 10 are in a substantially vertical stowed position. Thus, returning the spare tire 7 and tire rack 10 from a lowered position to a stowed position can be accomplished in one upward motion, possibly with using only one hand. Safety clip or locking member 34 may then be installed through latch pin 30 to lockingly secure the entire assembly.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

I claim:

1. A rack for mounting an auxiliary item to a machine, said rack maintaining the auxiliary item adjacent to an outside vertical surface of the machine, said rack comprising:
   (a) an item holder having means for engaging said auxiliary item;
   (b) a support member connecting said item holder to said machine, said support member including a hinge having a pivot axis substantially horizontal and parallel to the outside vertical surface of the machine, said support member being swingable about said axis between a stowed position wherein said auxiliary item is adjacent to said outside vertical surface of the machine, and a lowered position wherein said auxiliary item is pivoted downwardly away from the machine; and
   (c) a latching means for securing said auxiliary item erect and adjacent to said outside vertical surface of the machine and for bearing a substantial portion of the weight of said auxiliary item; said latching means comprising:
   a latch pin projecting from said support member; and
   a latching bar having means defining an opening therein, a width dimension and a much smaller thickness dimension, and having an opening defined in a distal end of said latching bar, said opening facing and cooperatingly receiving said latch pin, and being made from resilient material which enables said latching bar to be resiliently bent away from said support member to an extent enabling said opening to be disengaged from said latch pin, whereby said item holder may be swung down from said stowed position to said lowered position.

2. A rack for mounting a spare tire to a motor vehicle, said rack maintaining the spare tire adjacent to a vertical surface of the motor vehicle, said rack comprising:
   (a) a wheel holder having means for engaging a spare tire;
   (b) a support member connecting said wheel holder to said motor vehicle, said support member including a hinge having a pivot axis substantially horizontal and parallel to the rear surface of the motor vehicle, said support member being swingable about said axis between a stowed position wherein the spare tire is adjacent to the vertical surface of the motor vehicle, and a lowered position wherein the spare tire is pivoted toward the rear of the motor vehicle, and downwardly; and
   (c) latching means for securing said wheel holder erect and adjacent to the vertical surface of the motor vehicle, said latching means comprising:
   a latch pin projecting from said support member; and
   a latching bar having a rectangular cross-section that includes a width dimension and a much smaller thickness dimension, and having an opening defined in a distal end of said latching bar, said opening facing and cooperatingly receiving said latch pin, and said latching bar being made from resilient material which enables said latching bar to be resiliently bent away from said support member to an extent enabling said opening to be disengaged from said latch pin, whereby said wheel holder may be swung down from said stowed position to said lowered position.

3. The rack according to claim 2, wherein said latch pin further includes retaining means for maintaining said latch pin engaged with said latching bar.

4. The rack according to claim 3, wherein said latching means comprises a locking member attachable to said latch pin.

5. The rack according to claim 3, wherein said retaining means comprises a clip attachable to said latch pin.

6. The rack according to claim 5, said latching bar further including an operating handle.

7. The rack according to claim 2, further comprising a stop means for limiting said lowered position, said stop means suspended above a supporting surface upon which the motor vehicle rests.

8. The rack according to claim 7, wherein said stop means comprises:
(a) fixed anchor means;
(b) movable anchor means; and
(c) fixed length flexible member connecting said fixed anchor means and said movable anchor means.

9. The rack according to claim 8, wherein said fixed length flexible member is a steel cable.

10. The rack according to claim 2, wherein said latching means comprises:
(a) a latch pin projecting from said support member;
(b) a latching bar having a rectangular cross-section that includes a width dimension and a much smaller thickness dimension, and having an opening defined in a distal end of said latching bar, said opening facing and cooperatingly receiving said latch pin, and said latching bar being made from resilient material; and
(c) an engaging ramp member, attached to a rearward edge of a distal end of said latching bar, such that said engaging ramp member is capable of releasably and slidingly engaging said latch pin, said engaging ramp member being made from resilient material which enables said latching bar to be resiliently bent away from said support member when said ramp member slidingly engages said latch pin, said latching bar capable of being resiliently bent away by said engaging ramp member to an extent which subsequently enables said opening to be engaged by said latch pin, whereby said wheel holder may be swung up from said lowered position to said stowed position with one upward motion.

11. A rack for mounting a spare tire to a motor vehicle, said rack maintaining the spare tire adjacent to a vertical surface of the motor vehicle, said rack comprising:
(a) a wheel holder having means for engaging a spare tire;
(b) a support member connecting said wheel holder to said motor vehicle, said support member including a hinge having a pivot axis substantially horizontal and parallel to the rear surface of the motor vehicle, said support member being swingable about said axis between a stowed position wherein the spare tire is adjacent to the vertical surface of the motor vehicle, and a lowered position wherein the spare tire is pivoted toward the rear of the motor vehicle, and downwardly;
(c) a latching means for securing said wheel holder erect and adjacent to the vertical surface of the motor vehicle; said latching means comprising:
a latch pin projecting from said support member;
a latching bar having a rectangular cross-section that includes a width dimension and a much smaller thickness dimension, and having an opening defined in a distal end of said latching bar, said opening facing and cooperatingly receiving said latch pin, and said latching bar being made from a resilient material which enables said latching bar to be resiliently bent away from said support member to an extent enabling said opening to be disengaged from said latch pin, whereby said wheel holder may be swung down from said stowed position to said lowered position and said latching bar having an operating handle;
a retaining means for maintaining said latch pin engaged with said latching bar; said retaining means comprising:
a clip attachable to said latch pin; and
a locking member attachable to said latch pin;
an engaging ramp member, attached to a rearward edge of a distal end of said latching bar, such that said engaging ramp member is capable of releasably and slidingly engaging said latch pin, said engaging ramp member being made from resilient material which enables said latching bar to be resiliently bent away from said support member when said ramp member slidingly engages said latch pin, said latching bar capable of being resiliently bent away by said engaging ramp member to an extent which subsequently enables said opening to be engaged by said latch pin, whereby said wheel holder may be swung up from said lowered position to said stowed position with one upward motion;
(d) a stop means for limiting said lowered position, said stop means, suspended above a supporting surface upon which the motor vehicle rests, comprising:
a fixed anchor means;
a movable anchor means; and
a fixed length flexible member, connecting said fixed anchor means and said movable anchor means, comprising a steel cable; and
(e) a spring member connected to the hinge and biasing said support member toward the stowed position.

* * * * *